US009759580B2

(12) United States Patent
Mullenix

(10) Patent No.: US 9,759,580 B2
(45) Date of Patent: Sep. 12, 2017

(54) POSITION SENSOR

(71) Applicant: Texas Instruments Incorporated, Dallas, TX (US)

(72) Inventor: Joyce Mullenix, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 104 days.

(21) Appl. No.: 14/837,141

(22) Filed: Aug. 27, 2015

(65) Prior Publication Data

US 2017/0059364 A1     Mar. 2, 2017

(51) Int. Cl.
*G01D 5/20*     (2006.01)

(52) U.S. Cl.
CPC ........... *G01D 5/2006* (2013.01); *G01D 5/202* (2013.01)

(58) Field of Classification Search
USPC ......... 324/207.15, 207.13, 207.11, 200, 239, 324/207.25, 260, 76.11
See application file for complete search history.

(56) References Cited

U.S. PATENT DOCUMENTS

| 5,705,751 A * | 1/1998 | Briefer ................... G01D 5/202 73/722 |
| 7,451,659 B2 * | 11/2008 | Dallenbach .............. G01B 7/22 73/718 |
| 2007/0001667 A1 * | 1/2007 | Kirchdoerffer .... H03K 17/9505 324/207.15 |
| 2009/0319212 A1 * | 12/2009 | Cech ................... B60R 21/0136 702/65 |
| 2014/0247040 A1 | 9/2014 | Reitsma et al. |

OTHER PUBLICATIONS

U.S. Appl. No. 14/801,810, filed Jul. 16, 2015 for "Inductive Position Detection," 42 pages.

* cited by examiner

*Primary Examiner* — Melissa Koval
*Assistant Examiner* — Nasima Monsur
(74) *Attorney, Agent, or Firm* — John R. Pessetto; Charles A. Brill; Frank D. Cimino

(57) ABSTRACT

A position sensor includes a target having an electrical conductor having an exterior boundary, a void located at least partially within the conductor, and an opening extending between the exterior boundary of the conductor and the void, wherein the opening interrupts a current path in the conductor around the void.

20 Claims, 5 Drawing Sheets

POSITION SENSOR

BACKGROUND

Rotational encoders or position sensors are devices that determine the angular position of a rotating target based on eddy currents induced into the target. An excitation coil induces the eddy currents into the target wherein the strength of the eddy currents are proportional to the position of the target relative to the coil. The eddy currents change the inductance of the coil, wherein the strengths of the eddy currents are proportional to the change in inductance in the coil. The inductance of the coil is measured to determine the angular position of the target. Position sensing of the target can be achieved in part by the shape of the target in the X-Y plane, by the height of the target along the z-axis, which is normal to the X-Y plane, or with both shape and height parameters.

One problem with the above-described position sensors is that the target can act as a large parasitic inductor if it is shaped such that conductive portions of the target form a closed current path. This large parasitic inductor causes an alternate method of coupling than was intended in the original target design. While the intended mechanism for measurement is in the generation of eddy currents in close proximity to the coil, the large parasitic inductor can cause additional eddy currents to be generated at much larger distances. These additional eddy currents decrease the total change in inductance in the excitation coil at close proximity, which reduces the accuracy of the position sensing.

Additionally, for systems with two or more excitation coils, the closed current paths resulting from the parasitic inductance in the target can also cause alternative paths of coupling between the coils at large distances. The closed current paths can be in either the lateral or vertical dimension and further diminish the accuracy of the position sensing.

SUMMARY

A position sensor includes a target having an electrical conductor having an exterior boundary, a void located at least partially within the conductor, and an opening extending between the exterior boundary of the conductor and the void, wherein the opening interrupts a current path in the conductor around the void.

DETAILED DESCRIPTION

Figure 1A:
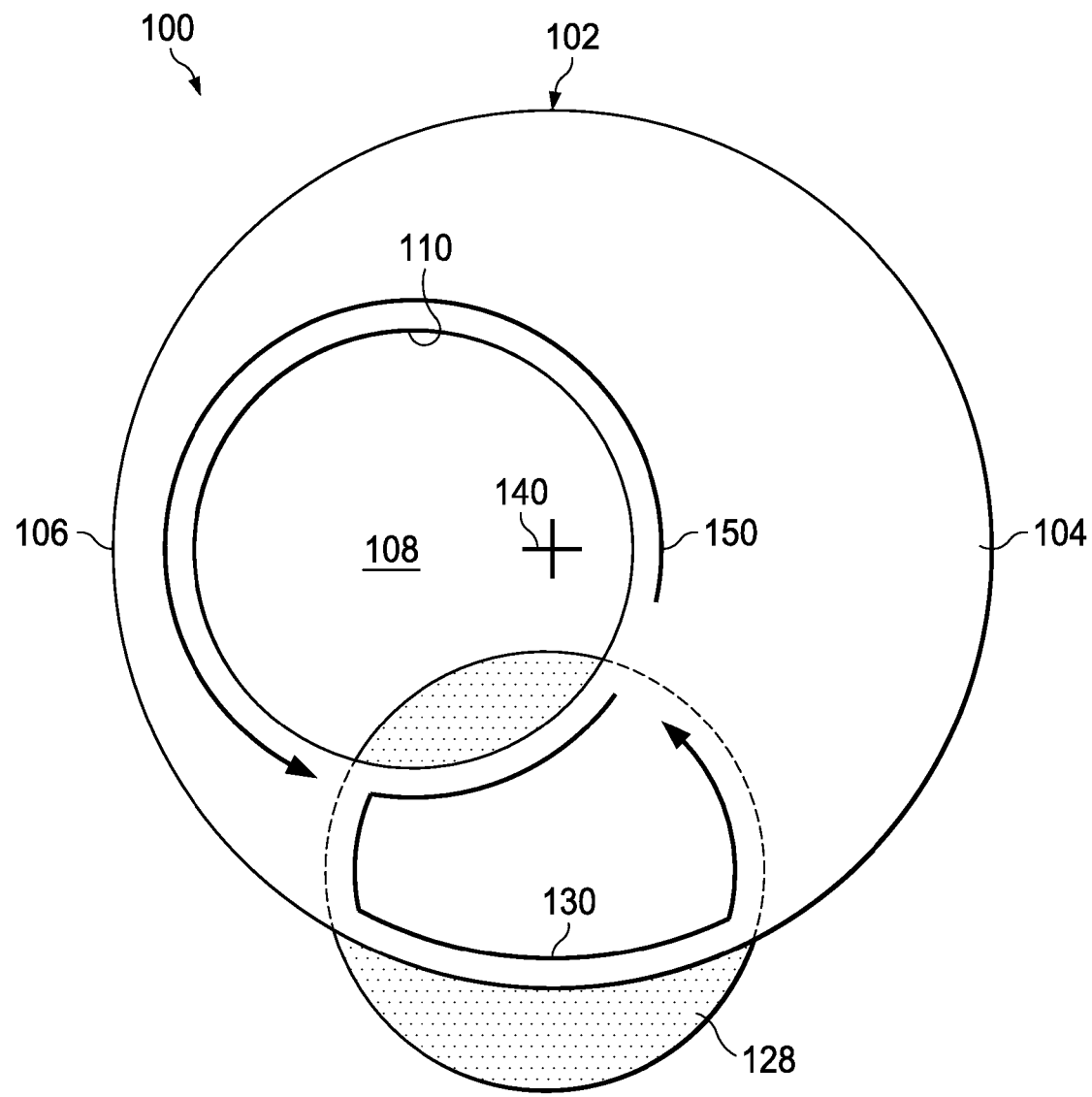
FIG. 1A is a top plan view of an embodiment of a prior art position sensor.
Figure 1B:
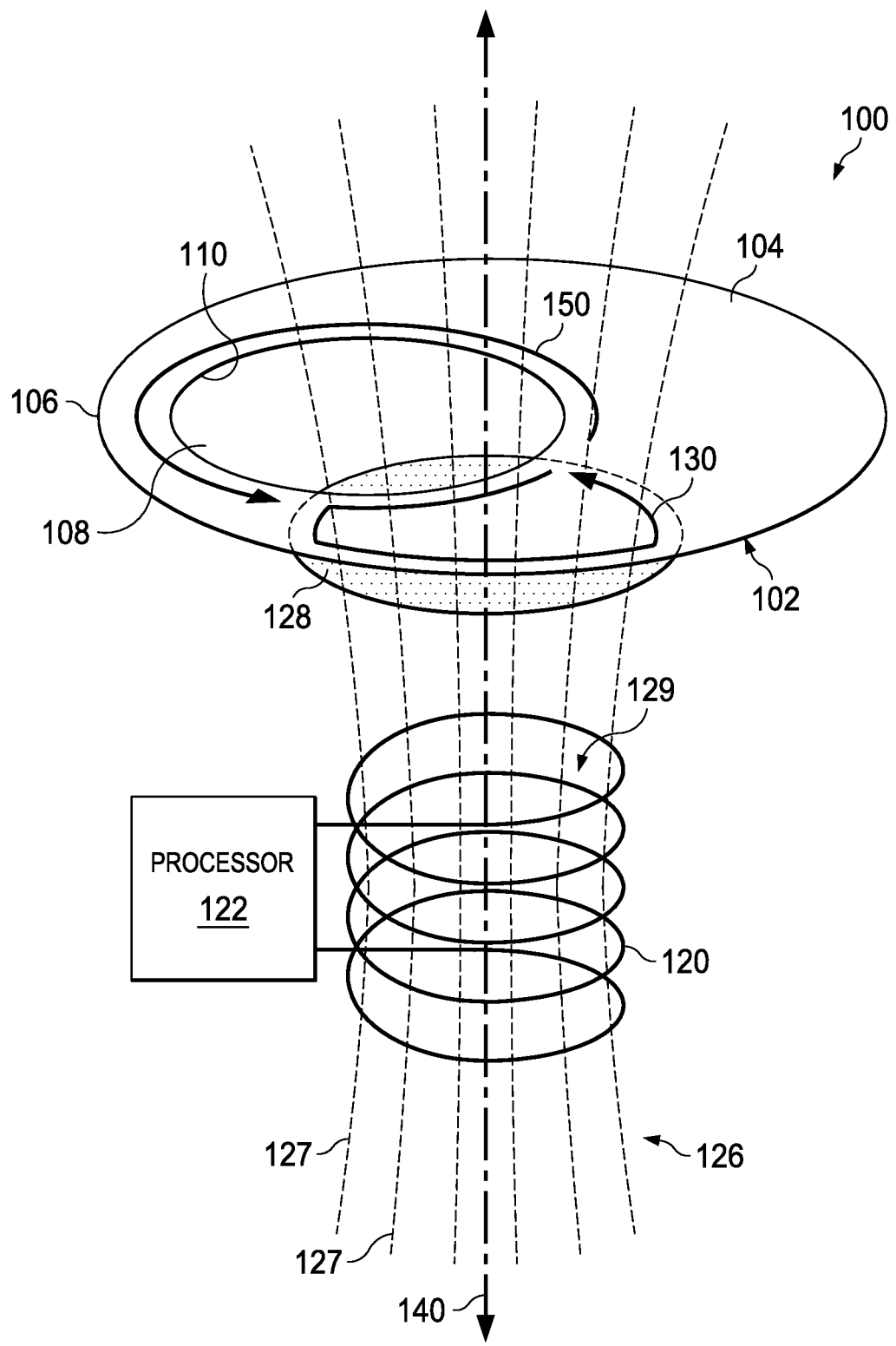
FIG. 1B is an isometric view of the position sensor of FIG. 1A.

FIG. 1A is a top plan view of an embodiment of a prior art position sensor 100 and FIG. 1B is an isometric view of the position sensor 100. The position sensor 100 is sometimes referred to as a rotational encoder. The position sensor 100 includes a target 102 that has a conductor 104 at least partially defined by an outer boundary 106. A conductor is a material that conducts electric currents. Examples of conductors include electrically conductive metals. In some examples of the conductor 104 and/or the outer boundary 106 are circular or substantially circular, but may be a plurality of different shapes as will be apparent to those skilled in the art. The target 102 includes a void 108 within the conductor 104, wherein the void 108 has an edge that defines an inner boundary 110 of the conductor 104. The conductor 104 is a metal or an electrically conductive material that enables electric currents induced by a magnetic field to flow as described herein. The void 108 is open space or at least partially consists of a material that does not enable electric currents to flow or the void 108 may include a material that has a higher resistance than the conductor 104.

An excitation coil 120 is located proximate the target 102 and is coupled to a processor 122 that serves as a power source for the coil 120. In addition to serving as a power source, the processor 122 measures the inductance and/or resonance impedance of the coil 120 as described further below. The processor 122 generates electric current that flows through the coil 120 and creates a magnetic field 126 shown by the magnetic field lines 127 of FIG. 1B. The magnetic field 126 is incident to the target 102 at a domain 128 of the magnetic field 126. In the example of FIG. 1B, the domain 128 is shown as a circle that has the approximate area as the area of an opening 129 of the coil 120. The magnetic field 126 induces eddy currents 130 into the conductor 104, which are measured by the effect they have on inductance and/or resonance impedance of the coil 120.

The target 102 is affixed to a rotating object (not shown) so as to rotate about an axis 140 and the coil 120 is maintained in a fixed location so that the target 102 moves relative to the coil 120. As the target 102 rotates, the area of the conductor 104 that is in the magnetic field 126 as noted by the domain 128 changes. The intensity of the eddy currents is a function of the area of the conductor 104 that is exposed to the domain 128 of the magnetic field 126. The intensity of the eddy currents affects the inductance and resonance impedance of the coil 120. The processor 122 measures the inductance and/or resonance impedance of the coil 120 to determine the location of the target 102 relative to the coil 120 as the target 102 rotates relative to the coil 120. The operation of the position sensor 100 is described in U.S. patent application Ser. No. 14,139,701 of George Pieter Reitsma for Position Detecting System, filed on Dec. 23, 2013, which is incorporated by reference for all that is disclosed.

At least one portion of the conductor 104 encircling the void 108 creates a parasitic path 150 for the eddy currents induced in the conductor 104 by the coil 120. For example, the conductor 104 can function as a large inductor if the void 108 is shaped such that it forms a closed current path as shown by the path 150. This path 150 causes an alternate method of coupling than was intended in the original design of the target 102. More specifically, the original design for eddy currents is shown by the path 130. These additional eddy currents in the path 150 change the inductance and/or resonance impedance of the coil 120, which prevents accurate measurements of the location of the target 102 relative to the coil 120. Some position sensors have multiple coils, so the parasitic paths may affect all the coils.

Figure 2A:
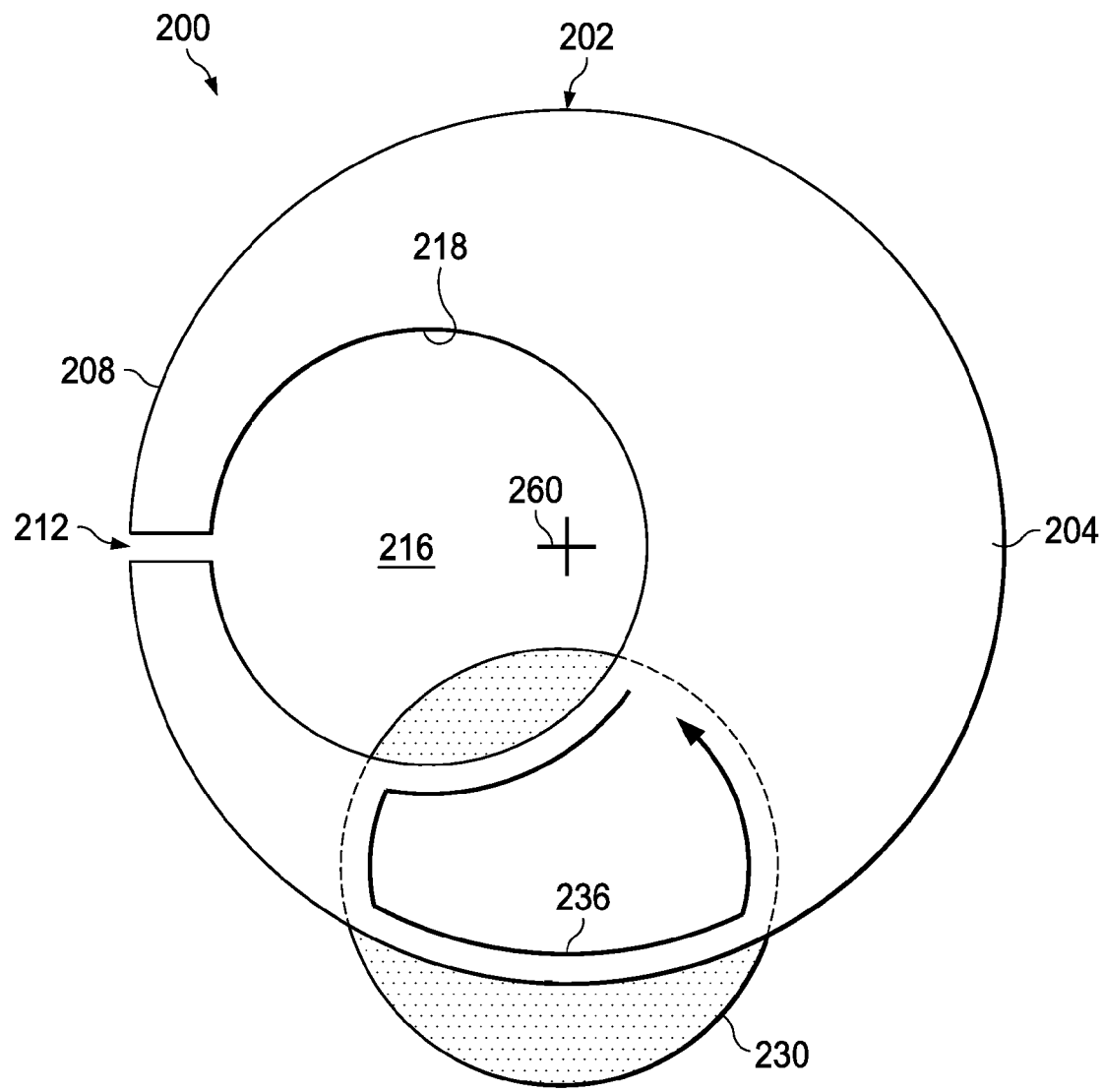
FIG. 2A is a top plan view of an example position sensor with a target that reduces or eliminates parasitic current paths.
Figure 2B:
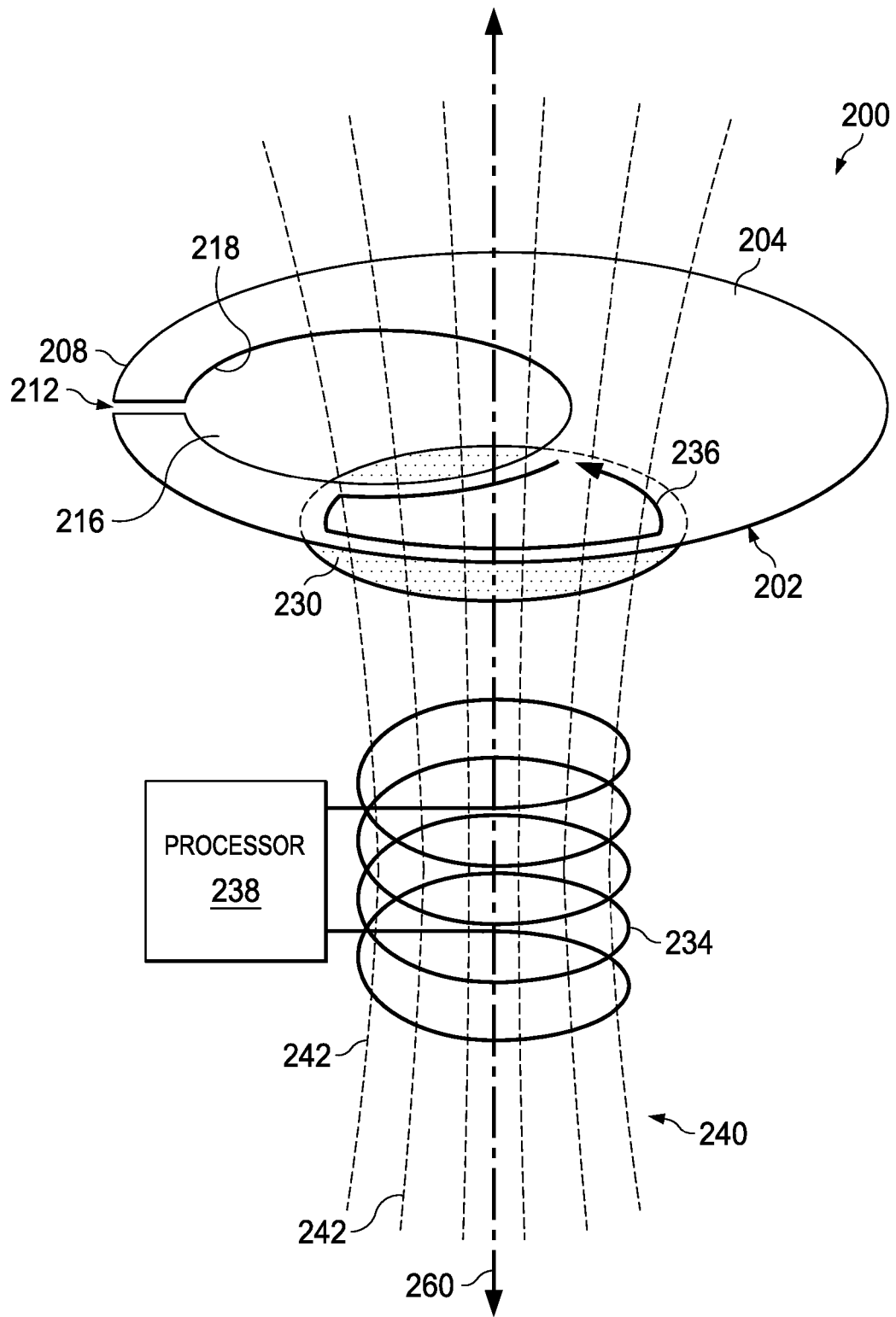
FIG. 2B is an isometric view of the position sensor of FIG. 2A.

The targets described herein overcome the issues related to the parasitic current paths by interrupting the paths for the parasitic current. FIG. 2A is a top plan view of a position sensor 200 with a target 202 that reduces or eliminates the above-described parasitic current paths. FIG. 2B is an isometric view of the position sensor 200 of FIG. 2A. The target 202 is a material that is the same as or that is substantially similar to the target 102 of FIGS. 1A and 1B. For example, the target 202 has a conductor 204 that conducts electric currents. In some examples, the conductor 204 is an electrically conductive metal. The conductor 204 has an outer edge 208 that forms the outer boundary of the conductor 204. Conventional conductors, such as the conductor 104 of FIGS. 1A and 1B, have continuous outer edges, but the conductor 202 described herein has an opening 212 extending inward from the outer edge 208 so that the outer edge 208 interrupts parasitic current paths around a void as described below.

The target 202 has a void 216 formed or located therein. The void 216 may be an empty space or it may be filled with a material that is less conductive than the conductor 204. The void 216 is defined or at least partially defined by a boundary 218. As shown in FIG. 2A, the opening 212 extends between the boundaries 208 and 218 so as to extend to the void 216 and interrupt an electrical current path in the conductor 204 that would otherwise extend around the void 216. Accordingly, the conductor 204 proximate the void 216 does not function as a path for parasitic current.

The position sensor 200 of FIGS. 2A and 2B has a magnetic field domain 230 generated by an excitation coil 234 that generates a current path 236 in the conductor 204. A processor 238 coupled to the coil 234 functions as the processor 122 of FIG. 1B and supplies current to the coil 234 and measures the inductance and/or resonance impedance of the coil 234 in response to the current in the current path 236. The coil 234 generates a magnetic field 240 shown by the magnetic field lines 242. The magnetic field 240 causes the current to flow in the path 236, which affects the inductance and/or resonance impedance of the coil 234. The inductance and/or resonance impedance of the coil 234 is measured by the processor 238 and is directly related to the area of the domain 230 on the conductor 204. The area of the domain on the conductor 204 is proportional to the location of the target 200 relative to the coil 234. Accordingly, the inductance and/or resonance impedance of the coil 234 is a function of the position of the conductor 204 relative to the coil 234.

The opening 212 prevents a current path from forming in the conductor 204 around the void 216, so the energy induced into the conductor 204 generates current primarily in the path 236. With the current located in the path 236, the problems associated with the parasitic eddy currents are eliminated with regard to the void 216 and more accurate position sensing is achieved.

In operation, the target 202 spins about an axis 260. The axis 260 is shown being substantially central to the target 202, but it need not be. The processor 238 generates current that flows through the coil 234 and generates the magnetic field 240. The magnetic field is incident on the conductor 204 and induces current flow in the conductor 204. The opening 212 prevents parasitic currents from flowing around the void 216, so the current is maintained in the path 236, which is in the domain 230 of the magnetic field 240. As the target 202 rotates, the amount of the conductor 204 that is in the domain 230 changes, which changes the inductance and resonance impedance of the coil 234. The processor 238 measures the inductance and/or resonance impedance and determines the position of the target 200 relative to the coil 234.

The target 200 and the void 216 have been described herein as being substantially circular. Other examples of targets include conductors and voids having a plurality of different shapes. For example, the conductors and voids may be oval or cardioids-like, among many different closed-path shapes. In all the shapes of the targets, an opening is provided from the void to interrupt the paths that parasitic eddy currents would otherwise take.

Figure 3:
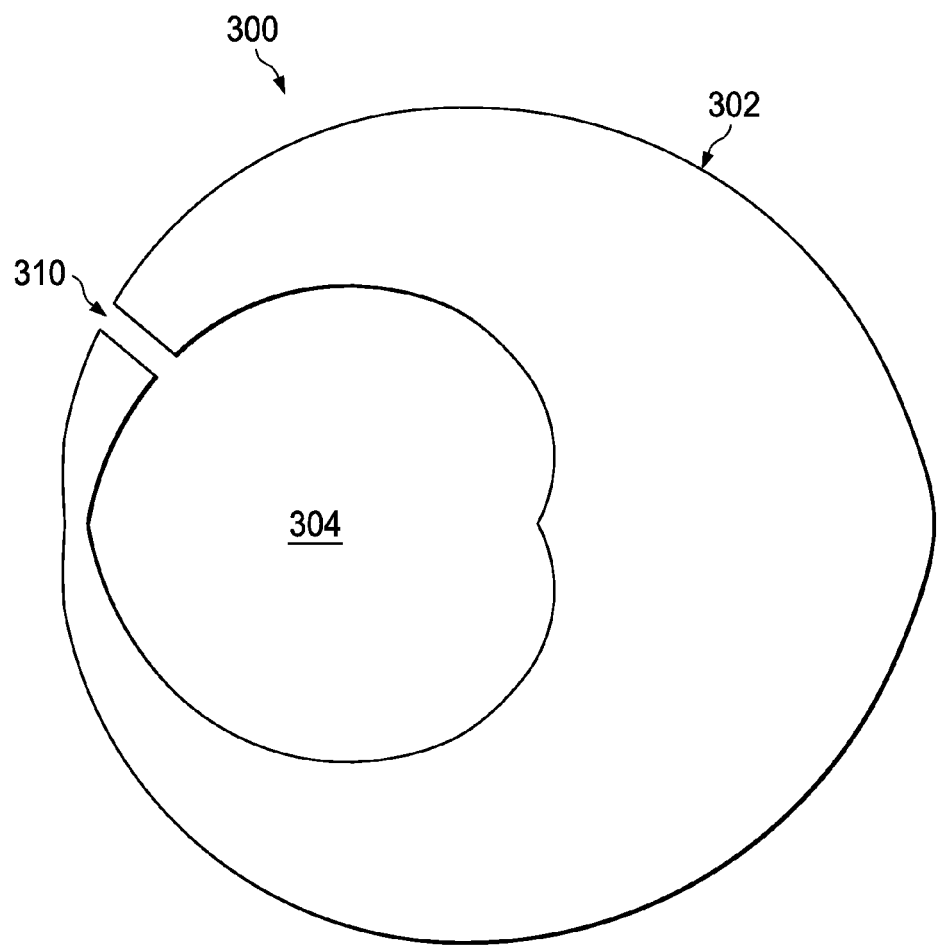
FIG. 3 is a top plan view of a cardioid-shaped target 300.

FIG. 3 is a top plan view of a target 300 that has a cardioids-like shape. The target 300 has a conductor 302 with a void 304 located within the conductor 302. Both the conductor 302 and the void 304 have shapes that are cardioid-like, which provides a specific impedance/resonance pattern in an excitation coil located proximate the target 300 as the target 300 rotates. An opening 310 interrupts a current path that would otherwise flow around the void 304.

Figure 4:
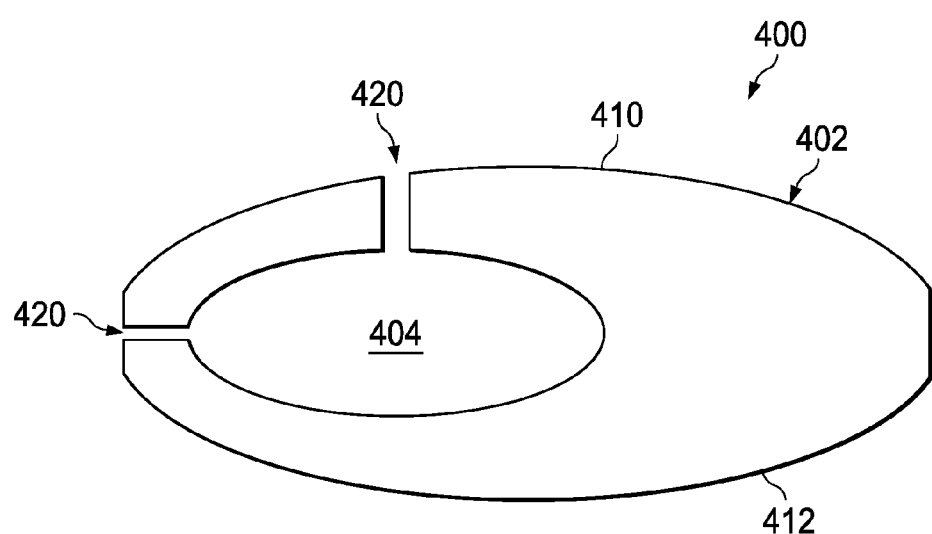
FIG. 4 is a side cutaway view of an example of a three dimensional target.

In some examples, the targets may have three-dimensional shapes, such as cones. In all the shapes, an opening exists to interrupt current paths around the void. FIG. 4 is a side cutaway view of an example of a three dimensional target 400. The target 400 has a conductor 402 and a void 404. In the example of FIG. 4, the void 404 is substantially surrounded by the conductor 402. In other examples, the void 404 may extend to a top surface 410 and a bottom surface 412 of the target 400. Because of the three dimensional nature of the target 400, a plurality of openings 420 may extend to the void 404 to interrupt parasitic current paths around the void 404. The openings 420 may be trenches extending for a distance.

While some examples of position sensors have been described in detail herein, it is to be understood that the inventive concepts may be otherwise variously embodied and employed and that the appended claims are intended to be construed to include such variations except insofar as limited by the prior art.

What is claimed is:

1. A position sensor comprising:
   a target comprising:
      an electrical conductor having an exterior boundary;
      a void located at least partially within, and asymmetrically positioned relative to, the exterior boundary of the electrical conductor; and
      an opening extending between the exterior boundary of the electrical conductor and the void, wherein the opening interrupts a current path in the electrical conductor around the void; and
   an excitation coil located proximate the target, wherein the excitation coil is for inducing current in the electrical conductor.

2. The position sensor of claim 1, wherein the void is less conductive than the conductor.

3. The position sensor of claim 1, wherein the void is free space.

4. The position sensor of claim 1, wherein the exterior boundary of the conductor is circular.

5. The position sensor of claim 1, wherein the void is circular.

6. The position sensor of claim 1, wherein the opening is a material that is the same as the void.

7. The position sensor of claim 1 further comprising a processor electrically coupled to the coil, wherein the processor is for measuring at least one of inductance of the coil and resonance impedance of the coil in response to the current induced in the conductor by the coil.

8. The position sensor of claim 1 further comprising a processor electrically coupled to the coil, wherein the processor is for generating electric current to flow through the excitation coil.

9. The position sensor of claim 1, wherein the target is three dimensional.

10. The position sensor of claim 9, wherein the void is located within the conductor.

11. A target for a position sensing device, the target comprising:
   a conductor having an exterior boundary;
   a void at least partially located in, and asymmetrically positioned relative to, the exterior boundary of the conductor, the void having a boundary; and
   an opening extending between the boundary of the void and the exterior boundary of the conductor.

12. The target of claim 11, wherein the void is less conductive than the conductor.

13. The target of claim 11, wherein the void is free space.

14. The target of claim 11, wherein the exterior boundary of the conductor is circular.

15. The target of claim 11, wherein the void is circular.

16. The target of claim 11, wherein the opening is a material that is the same as the void.

17. The target of claim 11, wherein the opening is free space.

18. The target of claim 11, wherein the conductor is locatable proximate a coil and is for changing at least one of inductance of the coil and resonance impedance of the coil in response to a current induced in the conductor by the coil.

19. The target of claim 11, wherein the target is three dimensional and wherein the void is located within the conductor.

20. A position sensor comprising:
   a target comprising:
      an electrical conductor having an exterior boundary;
      a void located at least partially within, and asymmetrically positioned relative to, the electrical conductor, the void being less conductive than the electrical conductor; and
      an opening extending between the exterior boundary of the electrical conductor and the void, wherein the opening interrupts a current path in the electrical conductor around the void;
   an excitation coil located proximate the target, wherein the excitation coil is for inducing current in the electrical conductor;
   a processor electrically coupled to the coil, wherein the processor is for measuring at least one of inductance of the coil and resonance impedance of the coil in response to the current induced in the electrical conductor by the coil and wherein the processors is for generating electric current to flow through the excitation coil.

* * * * *